United States Patent [19]

Hait

[11] 4,254,911
[45] Mar. 10, 1981

[54] SELF-PROPELLED IRRIGATION SYSTEM

[76] Inventor: James M. Hait, 8047 Chardonay Ct., San Jose, Calif. 95135

[21] Appl. No.: 950,933

[22] Filed: Oct. 12, 1978

[51] Int. Cl.³ .......................... B05B 3/00; B05B 3/18
[52] U.S. Cl. .................................. 239/177; 239/191; 239/721
[58] Field of Search ................ 137/344; 239/177, 212, 239/191

[56] References Cited

U.S. PATENT DOCUMENTS

| | | | |
|---|---|---|---|
| 2,893,643 | 7/1959 | Gordon | 137/344 |
| 3,259,319 | 7/1966 | Wallace | 239/177 |
| 3,465,766 | 9/1969 | Siebert | 137/344 |
| 3,536,261 | 10/1970 | Van Der Brink | 239/177 |
| 3,730,211 | 5/1973 | de Laine et al. | 137/344 |
| 3,836,078 | 9/1974 | Olson et al. | 239/70 |

Primary Examiner—Martin P. Schwadron
Assistant Examiner—A. Michael Chambers
Attorney, Agent, or Firm—J. F. Verhoeven; R. S. Kelly; H. M. Stanley

[57] ABSTRACT

A rotary irrigation system comprises a length of irrigation tubing formed by interconnected pipe sections and having sprinkler heads spaced along the length thereof, which tubing is connected at one end to a fixed upstanding water supply pipe and which is connected at the other end to a pulling tractor that is powered by the irrigation water under pressure in the tubing. The length of tubing is provided at spaced positions along its length with hydraulic cylinder powered support struts. The activation of the struts and the tractor is controlled by a timing mechanism at the central water supply pipe which periodically shuts off the flow of water to the tubing. When the flow of irrigation water is subsequently restored to the tubing the increased pressure in the tubing actuates a hydraulic cylinder in the tractor to drive the tractor through a predetermined distance and actuates the hydraulic cylinders in each of the struts to supply forces which act to lift and aid in moving the tubing forwardly in the direction in which it is pulled by the tractor.

8 Claims, 12 Drawing Figures

FIG_3

FIG_4

FIG_5

FIG_6

FIG_8

FIG_9

FIG_11

FIG_12

SELF-PROPELLED IRRIGATION SYSTEM

BACKGROUND OF THE INVENTION

1. Field of the Invention

The present invention pertains to movable irrigation systems, and more particularly, it pertains to irrigation systems which are arranged to be connected to a fixed water supply source and which are arranged to be moved in a predetermined path under power supplied by the water pressure therein to irrigate relatively large areas of land.

2. Description of the Prior Art

In those areas which receive little or no rainfall over extended periods of time, such as in the western portion of the United States, it is a common practice to water crops by means of movable irrigation systems. Typically, such irrigation systems comprise a string of interconnected pipe sections having sprinkler heads, or other water spreading means, arranged at spaced intervals along the length thereof and with support wheels being provided for the pipe sections at generally uniformly spaced intervals along the length thereof. The wheels may be arranged to support the pipe sections so that they pass through the axes of the wheels, or the wheels may be mounted on carriages for supporting the pipe sections at an offset position. In either case, the pipe sections and their associated sprinkler heads are supported at a fixed distance above the ground so that they will be above the crop which is to be irrigated. Some means is typically provided to move the string of pipe sections along the area to be sprinkled with the wheels rolling along in predetermined tracks. This movement can either be linear or it can be rotary, i.e., the pipe string can rotate about a central pivot axis where an upstanding water supply pipe is located to which one end of the pipe string is attached.

In the aforementioned rotary movement type of irrigation system, the interconnected string of pipe sections extends radially from the water supply pipe and is driven either by means of the carriages which support the pipe sections at spaced intervals therealong or by means of a single power mover connected to the string of pipe sections at or near the outer end thereof, a typical example of the latter arrangement being shown in U.S. Pat. No. 3,536,251 to Van den Brink. The power for the single power mover means may be provided by an electric battery, a gasoline driven engine, or through an electric power line running along the length of the irrigation tubing and connected to an electric outlet at the inner, fixed end thereof. Alternatively, the power mover may be powered directly through the water pressure in the pipe section.

The latter drive arrangement, wherein no source of power other than the water supply under pressure is needed, is obviously advantageous. Such a system has been found to be workable as the drive means must be geared to operate at a very low ground speed so that the total area being irrigated will be provided with sufficient water. Typically, the string of interconnected pipe sections makes one complete revolution in the time normally required between waterings (about eight days); hence, the entire length of irrigation tubing need only be continuously driven at a rate so as to make one revolution about the central water supply pipe every eight days.

Hydraulically powered drive means for rotary irrigation systems, which operate under the water pressure in the irrigation tubing, may be located at the single power mover connected at the end of the tubing, or they may be located at each of the support carriages along the length thereof. Such systems may comprise a basic water wheel geared down to move the tubing at a very low rate, or they may comprise cylinder and piston arrangements which drive in only one direction. For example, the United States patent to de Laine et al U.S. Pat. No. 3,730,211 discloses the latter type of apparatus wherein an elongate tubing is connected at one end to water under pressure and at the other end to an hydraulic towing device, such device comprising a cylinder housing a piston having a piston rod which extends from the cylinder, valve means operable to cause the water under pressure to reciprocate the piston within the cylinder, and a one-way linkage connected to the piston rod for preventing the movement of the cylinder and the piston rod in one and the same direction so that the towing device moves in a forward direction only.

Other prior United States patents which show hydraulic cylinder and piston devices for moving irrigation tubing wherein such devices operate under the power supplied by the flow of irrigation water in the tubing include U.S. Pat. No. 2,893,643 to Gordon and U.S. Pat. No. 3,259,319 to Wallace.

SUMMARY OF THE INVENTION

The present invention comprises a self-propelled irrigation system which utilizes a plurality of supporting means provided at spaced positions along the length of the irrigation tubing. Power means are associated with each of the supporting means and are connected with the flow under pressure in the tubing for causing the supporting means to elongate a direction transverse to the tubing to lift and push the tubing in short incremental movements about the area to be irrigated. In order to actuate such power means, which means are spaced along the tubing, additional timing means are provided at the water supply source to periodically temporarily block the flow of water into the tubing to thereby decrease the pressure in the tubing. The flow is subsequently restored to initiate a new power cycle in the power means.

In the preferred form of the invention the power means comprise hydraulic cylinder devices which serve primarily to support and perhaps aid in pushing the tubing while the primary driving force is provided by a power mover connected to the end of the tubing. Such power mover can also be hydraulically activated under the intermittent pressurization and depressurization of the water in the tubing. Also, in the preferred form of the invention, a rotary drive arrangement is provided wherein the water supply source is provided at the center of the area to be irrigated and the power mover is connected to the outer end of the tubing to move the tubing in a circle about the source.

DESCRIPTION OF THE PREFERRED EMBODIMENTS

Figures 1, 2:
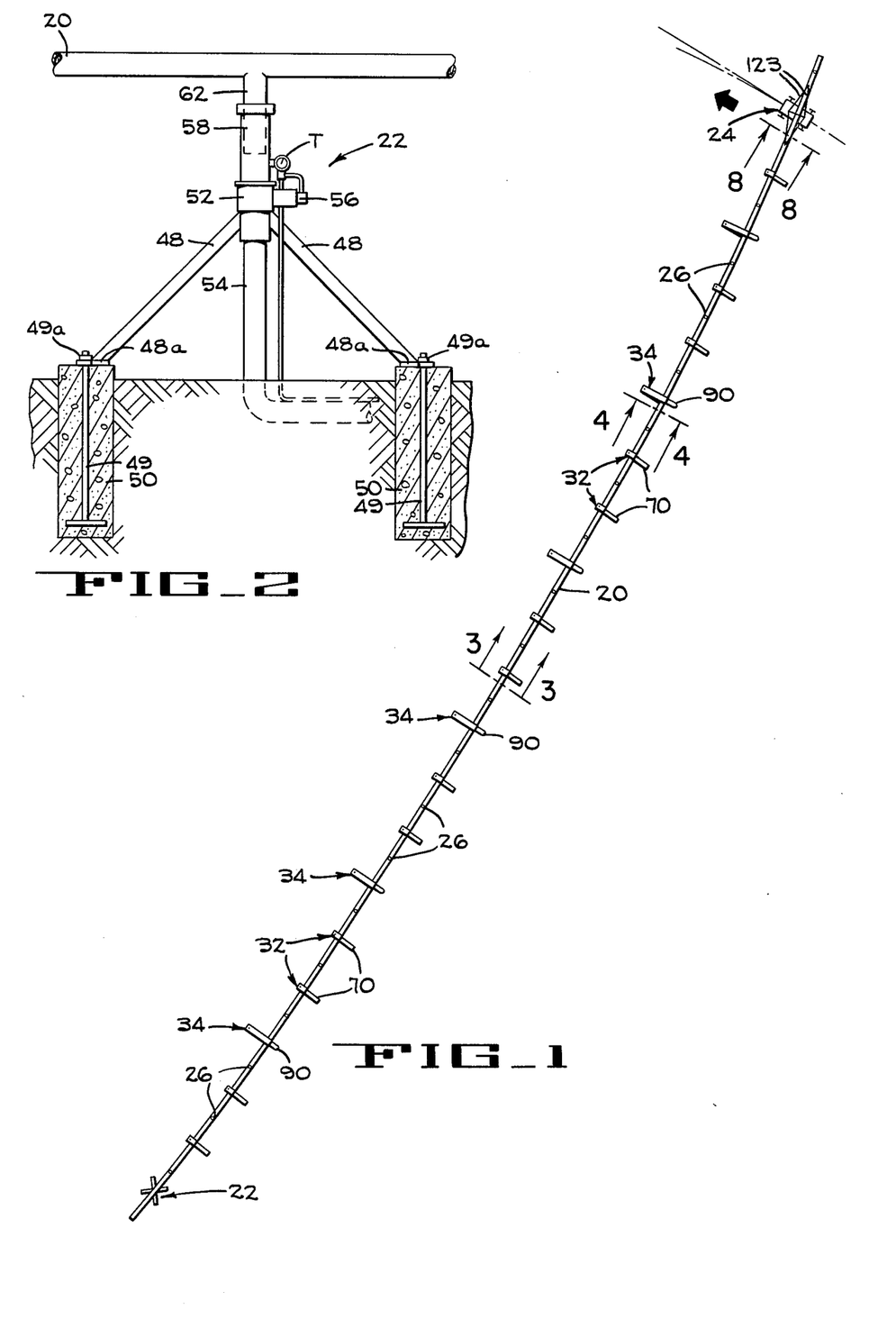
FIG. 1 is a diagrammatic plan view of the self-propelled irrigation system of the present invention.
FIG. 2 is an enlarged side elevation of the central water supply hydrant for the system of FIG. 1.

Referring now more particularly to the drawings, FIG. 1 is a plan view of a rotary irrigation system constructed in accordance with the present invention. The system will be seen to comprise a long length of irrigation tubing 20 having one end connected to a center pivot assembly 22 and the other end connected to a power mover, or tractor, 24. The center pivot assembly is arranged to be connected to a source of water under pressure and is adapted to direct such water to the connected length of irrigation tubing. A plurality of sprinkler heads 26 are spaced along the length of the tubing with each of the sprinkler heads being arranged to disperse water over a generally circular area of increasing radius moving out along the length of the tubing so that a pie-shaped segment of the field is irrigated for each stationary setting of the tubing 20. The tractor 24 is arranged to move in a generally circular path about the pivot assembly when it is actuated.

The irrigation tubing 20 can be made up in the conventional manner wherein it comprises a plurality of interconnected pipe sections which are connected to and supported by a plurality of support wheel assemblies 32 and 34, such assemblies being centered on opposite sides of the tubing with the assemblies 34 being located well forward of the tubing with respect to its direction of movement (shown by the arrow in FIG. 1) and with the assemblies 32 being centered slightly to the rear of the tubing. These support wheel assemblies support the tubing at an elevation above the ground which permits the tubing to clear the crop which is being irrigated and also permit the tubing to be readily moved about the center pivot assembly 22. For a further and more detailed description of the construction of the tubing 20, the center pivot assembly 22 and the support wheel assemblies 32 and 34, reference is made to my co-pending patent application Ser. No. 930,320 which was filed on May 5, 1978 and is entitled Automatic Rotary Irrigation System.

Figure 3:
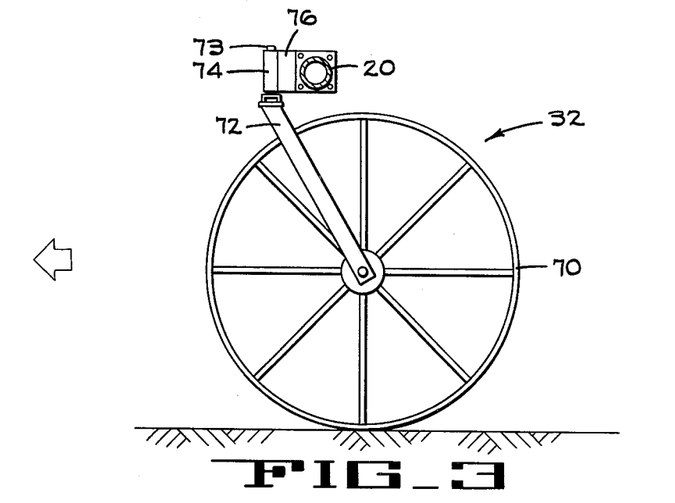
FIG. 3 is an enlarged section taken generally along the line 3—3 of FIG. 1.

Details of one of the trailing support wheel assemblies 32 are shown in side elevation in FIG. 3. The assembly will be seen to comprise a large support wheel 70 which is connected to the tubing 20 so that the tubing will be supported well above the ground surface. The wheel 70 is rotatably mounted in a fork 72 which is connected to a spindle 73 that is free to rotate about a vertical axis in a cylindrical bearing 74. Fork 72 is shaped so that the drag provided by the wheel causes the lower portion of the fork to trail behind the upper portion of the fork during powered movement of the tubing. This combination of spindle 73, bearing 74 and fork 72 provides a caster mounting so that the fork 72 is free to rotate to keep the wheel 70 aligned in the direction that the connected portion of the tubing 20 is being moved across the field. The bearing 74 is mounted by means of a bracket structure 76 to the main body of the tubing 20. It will be seen from FIG. 3 that the axis of rotation of the wheel 70 of the wheel assembly 32 is located just rearwardly of the center line of the tubing 20 with respect to its direction of movement (indicated by the arrow in FIG. 3). It will be recognized that this support provides stability for the tubing to prevent it from overturning--particularly when it is loaded with water during sprinkling.

Figure 4:
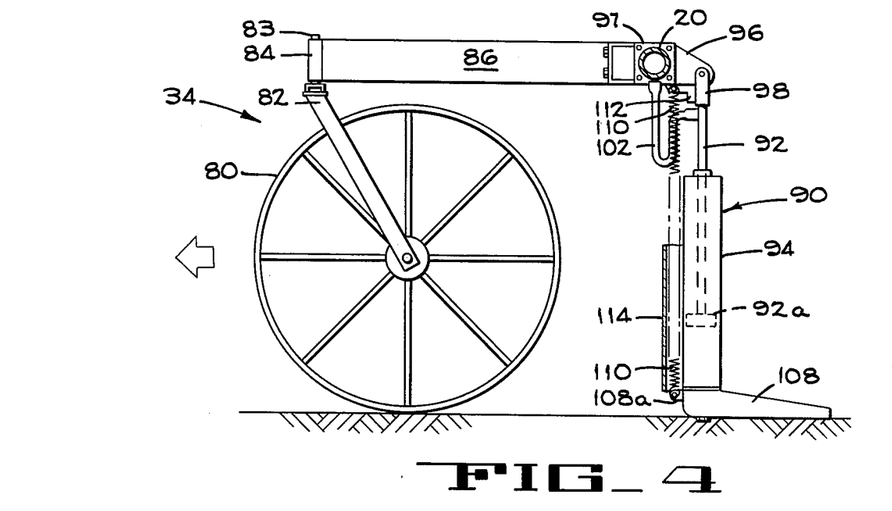
FIG. 4 is an enlarged section taken generally along the line 4—4 of FIG. 1.

One of the leading support wheel assemblies 34 is shown in side elevation in FIG. 4. Each assembly 34 is constructed generally similarly to the assemblies 32 and will be seen to comprise a large wheel 80 which is rotatably connected to a fork 82 that is, in turn, secured to an upright spindle 83. The spindle is mounted for rotation about a vertical axis in a cylindrical bearing member 84. The wheel 80, fork 82, spindle 83 and bearing 84 are in all respects the same as the similar members 70, 72, 73 and 74 previously described with respect to the wheel support assemblies 32. Bearing 84 is secured to the tubing 20 by means of an elongated beam 86 so that the entire wheel 80 will be placed well forward of the tubing 20 with respect to the direction of movement of the tubing (indicated by the arrow in FIG. 4). This arrangement provides stability for the tubing during its movement over the ground surface and prevents the tubing from being tipped over in the forward direction should the support wheels 70, 80 encounter obstacles such as rocks or holes.

The center pivot assembly 22 is shown in FIG. 2 of the drawings wherein it will be seen to be braced to resist the radially outward pull of the tractor 24. A plurality of angularly oriented braces 48 are each tightly secured to a corresponding concrete footing 50 which is buried in the surface of the ground about the water source at the center of the area to be irrigated. The lower ends of the braces include flanges 48a which are secured to an anchor bolt 49 by a nut 49a threaded onto the upper free end of the anchor bolt with the anchor bolt being buried in the corresponding concrete footing 50. The upper end of each of the braces is connected to an enlarged coupling and valve member 52 which is coupled to the upper end of a short section of vertically extending pipe 54 containing the water supply under pressure. Coupling 52 containing a shut-off valve (not shown in detail) is controlled by an electrically operated solenoid 56. The upper, or outlet, end of the valve 52 mounts a short coupling member 58 which is arranged to receive for relative rotary movement about the vertical axis thereof a T-shaped pipe section 62 to which the inner end of the length of irrigating tubing 20 is secured. The details of the rotary connection between the pipe section 62 and the coupling member 58 are not shown herein but may be of the type shown in my co-pending United States patent application Ser. No. 861,321, entitled A Rotary Irrigation System, which is incorporated herein by reference.

The operation of the solenoid valve 56 is controlled by a timer T which is mounted at the center pivot assembly 22 as shown in FIG. 2. The timer operates so that flow will be permitted to the irrigation tubing 20 for predetermined intervals of time spaced by predetermined shorter intervals of time wherein the flow is blocked by a closed shut-off valve in the coupling member 52. The purpose and timing of such periodic interruptions of the flow of irrigation water to the tubing 20 will be explained in detail hereinafter.

One of the important features of the present invention are the tubing support struts 90 which are arranged to both support and push the tubing forwardly at uniformly spaced locations along the length of the tubing. Thus, from FIGS. 1 and 4, it will be seen that adjacent each of the leading wheel assemblies 34 there is positioned one of the hydraulically powered support struts 90. Details of the construction and mounting of the struts are shown in FIG. 7 of the drawings.

Figure 7:
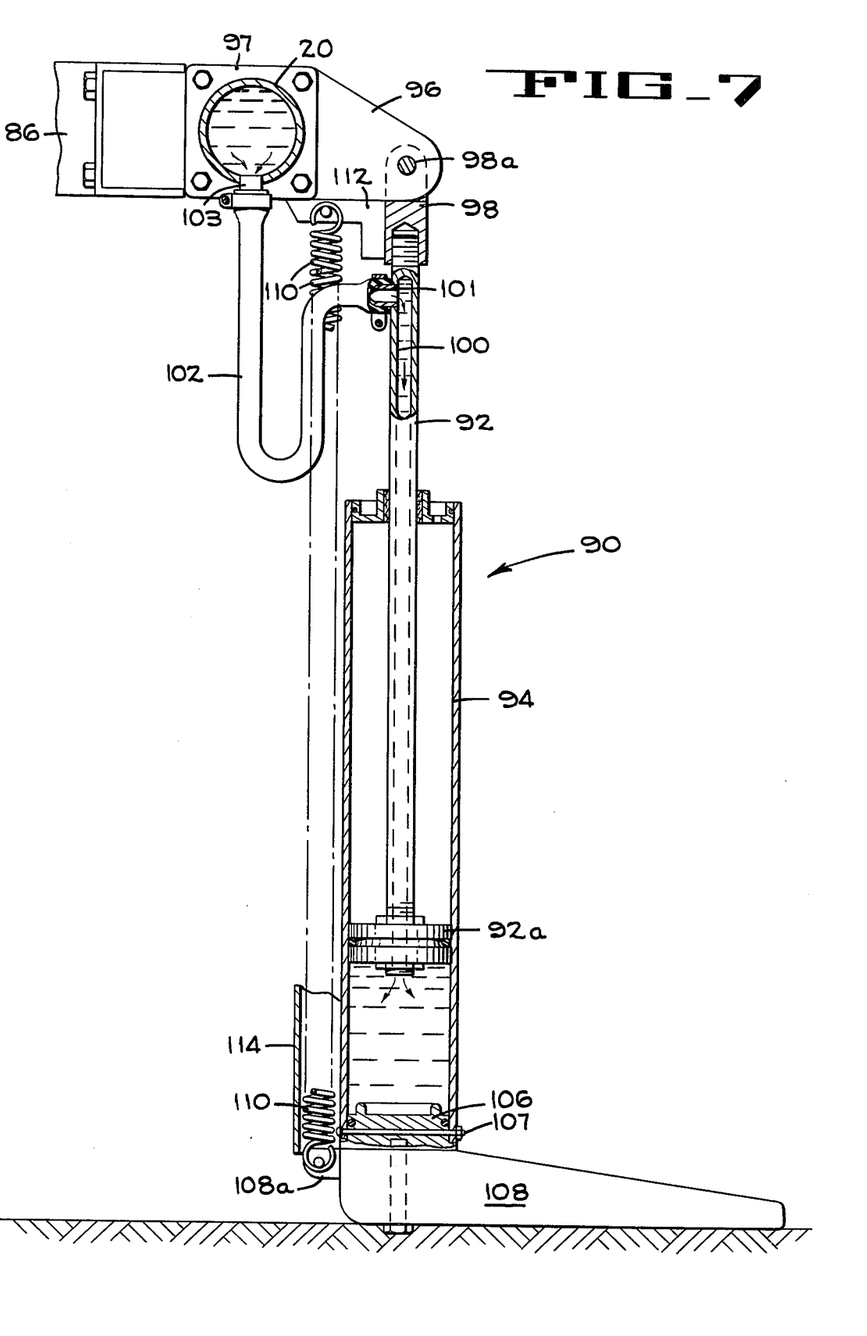
FIG. 7 is an enlarged vertical section through one of the hydraulic cylinder support mechanisms.

It will be seen, from FIG. 7, that each strut 90 generally comprises a single-acting hydraulic cylinder assembly, including piston member 92 and a cylinder member 94 which are aligned so that the strut is capable of elongation to push the tubing 20 upwardly. Thus, the piston member 92 is connected to the tubing by means of a bracket 96 which is secured to a clamping structure 97 attached about the periphery of the tubing as shown. The bracket 96 extends from the trailing side of the tubing, and a yoke 98 is pivotally connected by means of a pin 98a to the projecting end thereof. The upper end of the piston member is threaded into the lower end of the yoke 98 so that the piston member is free to pivot about the axis of pin 98a as it is extended within the cylinder member 94.

As shown in FIG. 7, the stem of the piston member 92 and the piston head 92a of each strut 90 are provided with a passageway 100 extending therethrough so as to provide communication between the working portion of the cylinder member 94 and a fitting 101 at the upper end of the piston member. A flexible hose 102 is clamped about the fitting 101 and is similarly clamped about a fitting 103 which communicates with the irrigation tubing 20 adjacent the strut. It will be recognized, therefore, that when irrigation water under pressure is present in the tubing 20 (i.e., during sprinkling) it will flow through the hose 102 and passageway 100 of the piston member to cause the piston member to be elevated relative to the body of the cylinder member 94. The cylinder member 94 is closed and sealed at its lower end by a plug 196 which is retained by a retainer pin 107. Bolted to the bottom of the cylinder member is an elongated support foot 108 which extends rearwardly with respect to the direction of movement of the pipe and provides sufficient supporting surface area to prevent the strut from digging into and becoming mired in the wet ground surface. Attached to the forward end of the support foot is an ear 108a to which is connected the lower end of a tension spring 110. The upper end of the tension spring is connected to a stop member 112 which depends from the bracket 96 that is attached to the irrigation tubing. Secured to the side of the cylinder member 94 and positioned so as to surround the spring 110 is a guard 114 which functions to prevent the spring from becoming entangled in the crops or other foilage or obstacles in the area being traversed by the irrigation tubing.

As stated hereinbefore when water pressure is present in the irrigation tubing 20, flow into the cylinder member 94 will cause the piston member 92 and the cylinder member to elongate against the force of the return spring 110. This elongation first causes the support foot 108 to firmly engage the underlying ground surface and then lifts the tubing 20 upwardly under continued flow into the cylinder member until the hydraulic pressure on the piston head 92a is balanced by the weight supported by the piston plus the force of the return spring. It will be noted that since the piston member is always at the upper end of the working portion of the cylinder, any foreign matter (such as sand, dirt, etc.) in the irrigation water supply will descend to the bottom of the cylinder and will not tend to destroy the seal at the piston head. The return spring 110 functions to pivot the strut inwardly until the yoke member 98 engages the stop member 112 during those brief times intervals when water pressure is relieved in the tubing--which is shown in the operational diagrams of FIGS. 5 and 6.

Figure 8:
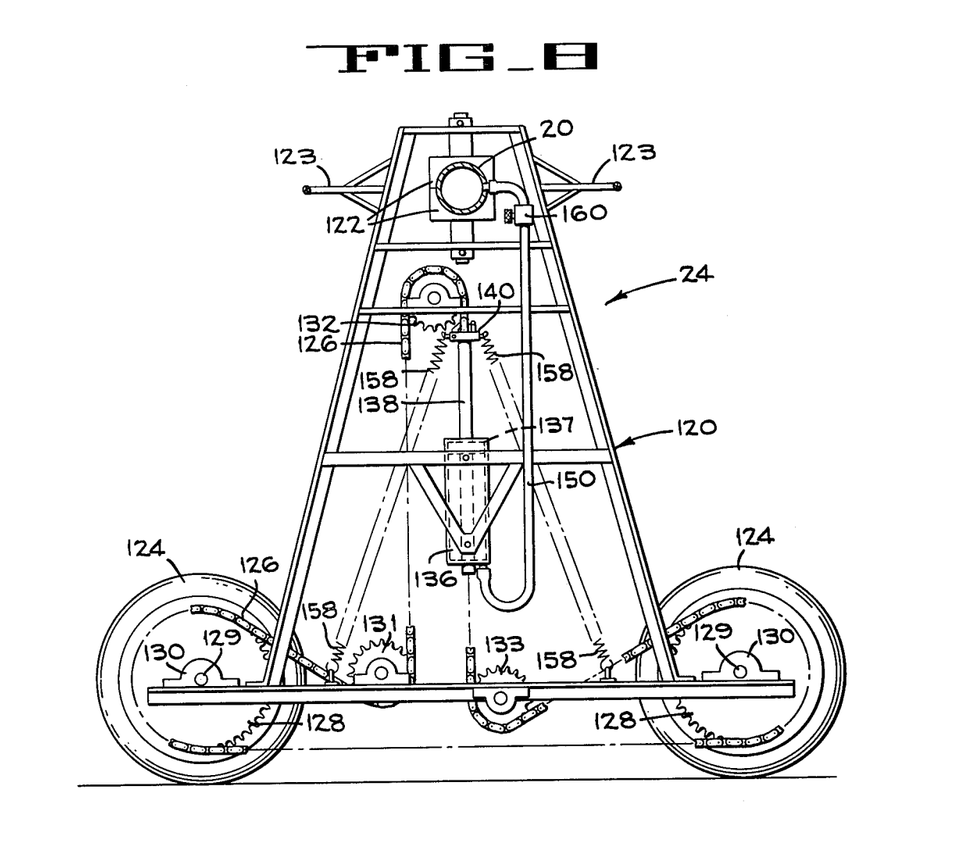
FIG. 8 is an enlarged section particularly showing the tractor connected at the end of the tubing for moving the tubing in a circular path, said section being taken along the line 8—8 of FIG. 1.
Figure 9:
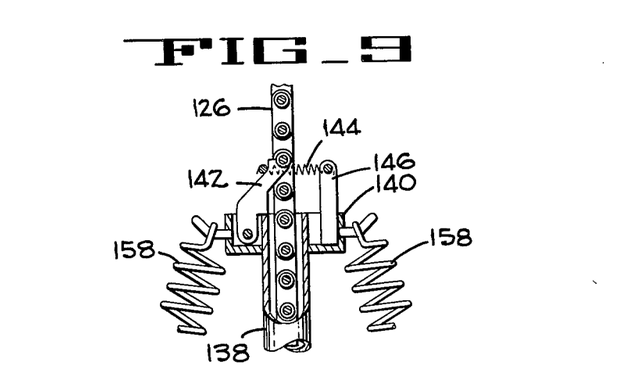
FIG. 9 is an enlarged detail view, partially in section, of the drive pawl mechanism for driving the tractor of FIG. 8.

The tractor 24 is shown in detail in FIGS. 8 and 9 and will be seen to comprise an upstanding frame structure 120 which is rigidly secured about the outer end of the irrigation tubing 20 by means of a pair of clamping blocks 122 and truss cables 123 (FIGS. 1 and 8). The frame structure is supported upon the ground surface by a pair of aligned wheels 124 which are driven by means of an endless chain 126. The endless chain is received about a pair of drive sprockets 128 which are respectively attached to wheel support shafts 129 that are mounted in bearing blocks 130 secured to the lowermost member of the frame structure. The endless chain is trained about a plurality of sprockets 131, 132 and 133 mounted upon the frame structure so that it traverses a generally vertical path in alignment with the axis of the tubing 20, as shown in FIG. 8. Also aligned in said vertical path and rigidly secured to the frame structure is a hydraulic cylinder 136 having a piston 137 operating therein which is connected to the central portion of a tubular piston rod 138 extending from opposed ends of the cylinder. The piston rod 138 is arranged to loosely receive the endless chain allowing it to pass freely therethrough. As shown in detail in FIG. 9, the upper end of the tubular piston rod 138 is provided with a projecting annular sleeve 140 which serves to pivotally mount an upright pawl 142. A spring 144 is connected at one end to the pawl and is secured at its other end to a mounting post 146 carried by the sleeve so that the pawl is continuously pulled over into interference with the endless chain 126. The lower end of the cylinder 136 is connected by means of a tube 150 with the water under pressure in the irrigation tubing 20. Thus, when irrigation water is present in the tubing 20, the piston 137 will be moved to the upper end of the cylinder. This upward motion of the piston within the cylinder causes the pawl 142 to engage one of the links on the endless chain 126 and force the chain to move through the same linear distance as the piston which, in turn, rotates the wheels 124 through such predetermined distance. A pair of tension springs 158 (FIGS. 8 and 9) are connected between the sleeve 140 at the upper end of the piston rod and the frame structure 120 so that upon release of water pressure in the irrigation tubing such springs cause the piston to move downwardly relative to the fixed cylinder 136 while the pawl 142 pivots outwardly and rifes over the chain links. This arrangement thereby provides a one-way intermittent drive for the tractor.

It will be appreciated, therefore, that the tractor, during those times when water pressure is restored in the tubing 20, will be caused to move through a predetermined circular distance about the upright axis of the central pivot assembly 22 as determined by the amount of travel of the piston 137 within the cylinder 136. In order to restrict this movement and control its duration, a restrictive orifice 160 is placed in the tubing 150 which connects the irrigation tubing 20 with the power cylinder 136.

It will also be recognized that the elongation of the struts 90 and the propelling movement of the tractor 24 occur simultaneously and must overcome the drag resistance of the support wheel assemblies 32 and 34. While, as shown in FIG. 1, the tractor may serve as the primary pulling force during this movement with the struts 90 serving only to lift and aid in pushing the tubing when it is full of water, it is altogether possible that the tractor might serve only as a control means to retard and control the movement of the outer end of the tubing whereby the tubing would bow in the forward direction rather than in the rearward direction (as shown in FIG. 1) with the propulsion being provided solely by the forces provided by the elongating struts 90. By adjusting the flow into the hydraulic cylinders 136, 94 powering the tractor and struts, the relative movement of the tractor and struts can be adjusted to provide the optimum operating conditions.

Figure 5:
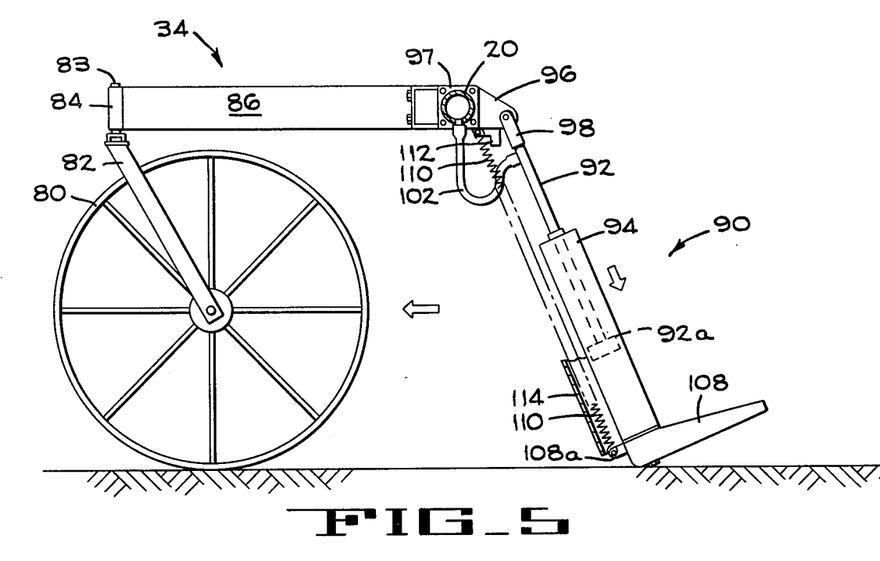
FIGS. 5 and 6 are sections similar to FIG. 4 but showing the hydraulic cylinder support means in two alternative positions during a single operating cycle.
Figure 6:
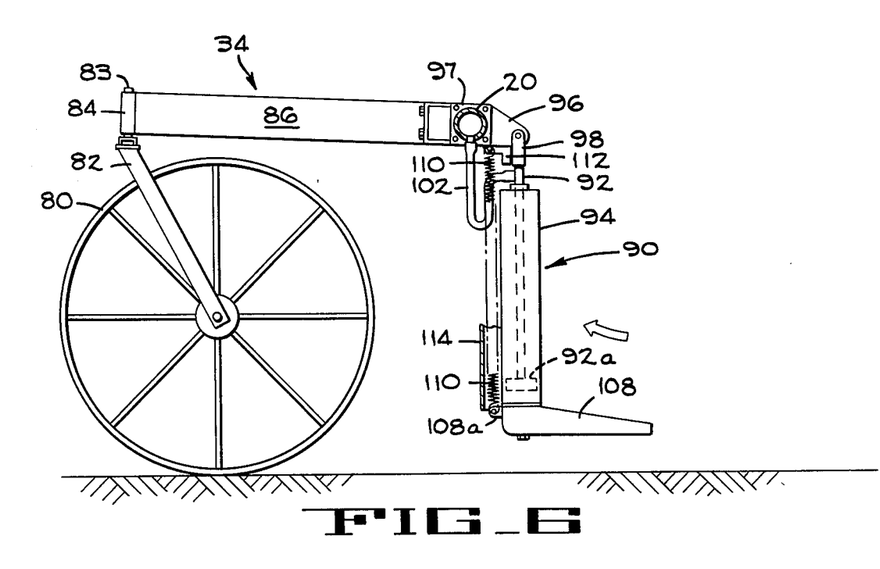

The lifting and pushing operation of the struts 90 is shown in FIGS. 5 and 6. It is normally desired that the timer T operate to permit flow over relatively long time periods (from ten to thirty minutes and, ideally, about fifteen minutes) with flow being shut-off for relatively short time periods (about one minute or so) therebetween. FIG. 5 shows the extreme extended position of the struts wherein the tubing 20 has been lifted and pushed forwardly for about the average travel distance of about three feet (measured somewhere near the outer end of the tubing). At this point the water pressure is blocked by the shut-off valve at the center pivot assembly 22, and the springs 100 move the cylinder members 94 upwardly and allow them to pivot inwardly to the position shown in FIG. 6 where the yoke 98 at the upper end of each cylinder engages the stop member 112. Under such noflow conditions, it will be seen that the strut will be elevated from the ground surface with sufficient clearance to permit the pivoting movement of the strut to be made without dragging the support foot 108 through the underlying ground surface. Also as shown in FIG. 6, the tubing will be temporarily supported only by the support wheel assemblies 32 and 34 and may thereby sag a little particularly at time of no flow (low pressure) in the tubing; however, such a condition will be brief since the support foot 108 will be rather rapidly extended downwardly into engagement with the ground surface to lift and push the tubing during the continuing sprinkling cycle. It can be seen therefore that the tubing 20 will be intermittently moved in short increments about the center pivot assembly 22 sprinkling continuously during such travel. When the tubing is stopped for the brief time intervals to permit the repositioning of the support struts 90, limited sprinkling will occur, and only due to the strut springs 110 and the main cylinder springs 158 which extrude water from within the tubing.

Figure 10:
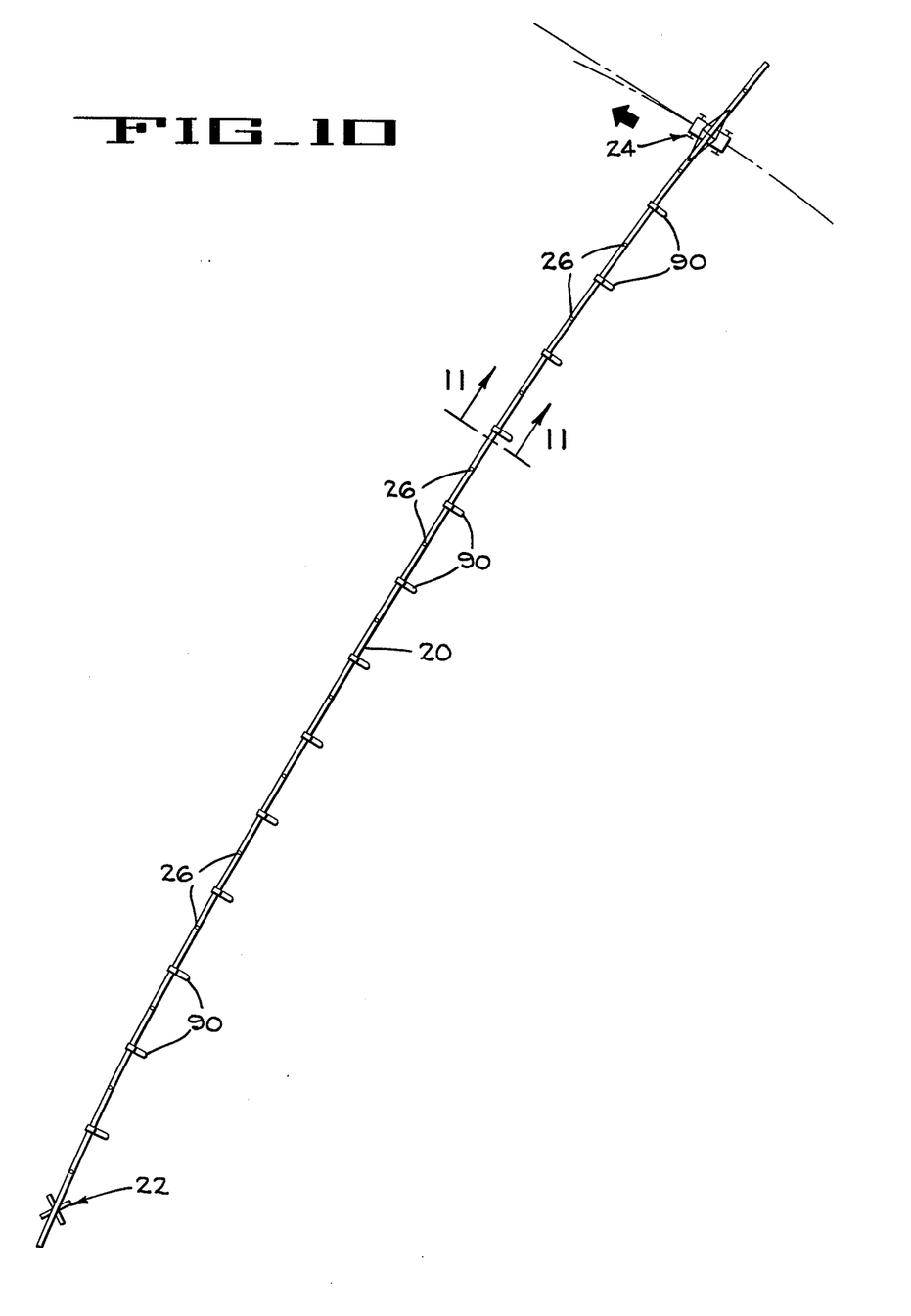
FIG. 10 is a diagrammatic plan view of a second embodiment of the self-propelled irrigation system of the present invention.
Figure 11:
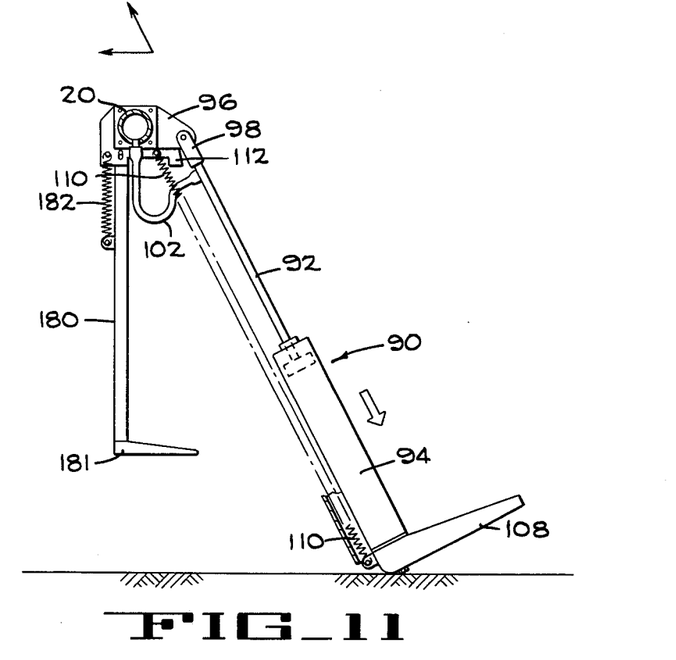
FIGS. 11 and 12 are operational views illustrating two separate stages in the operation of the hydraulic cylinder supporting mechanism of the system of FIG. 10, said views being generally enlarged sections taken along the line 11—11 of FIG. 10.
Figure 12:
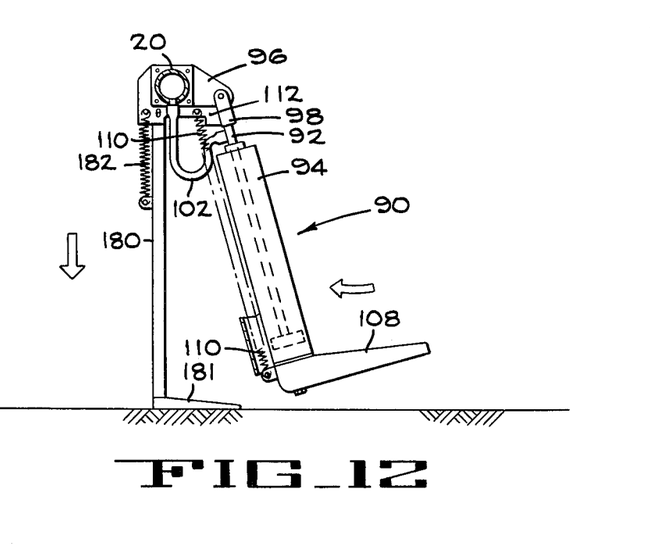

An alternative construction is shown in FIGS. 10-12. In this arrangement, the support wheel assemblies 32 and 34 are eliminated and the tubing is normally supported solely by the tractor 24 (at its outer end) and by the struts 90 spaced along the length thereof. However, arranged opposite to each of the struts 90 is a pivotally mounted auxiliary support member 180 which serves to support the tubing 20 in a sagging position, as shown in FIG. 12, during those brief time intervals when the flow is interrupted to the tubing and the struts 90 are elevated and allowed to pivot back into their initial support positions. As shown in FIG. 10, in the construction wherein the support wheel assemblies are eliminated, it is believed that the propelling power will primarily be provided by the struts 90 which will both lift and drive the tubing forwardly through a short distance (approximately three feet at the outer end of the tubing) with the tractor 24 serving only to retard the movement of the outer end of the tubing and control the overall speed of movement of the tubing. The auxiliary support members 180 will be seen to include elongated support feet 181 (similar to support feet 108) for sufficient ground engagement and a tension spring 182 which is fastened to the supporting structure so as to normally maintain the support foot in a vertical position but to allow it to pivot rearwardly if necessary so that it will not become hung up upon the crops or other obstacles in the path of travel of the tubing.

While the various support struts 90 are shown as being transversely arranged with respect to the tubing 20 it will be recognized that such struts can be angled slightly in the radially outward direction so as to provide a continuous outwardly directed tension force on the tubing so as to minimize the bending of the tubing.

Although the best mode contemplated for carrying out the present invention has been herein shown and described, it will be apparent that modification and variation may be made without departing from what is regarded to be the subject matter of the invention.

What is claimed is:

1. In a self-propelled irrigation system for connection to a source of water for irrigating a relatively large area of land, said system comprising a length of tubing for carrying water, a plurality of irrigation outlets arranged in spaced relationship along said length of tubing for discharging water therefrom, means for connecting one end of said tubing to said source, means for supporting said tubing at spaced points along the length and for causing said tubing to traverse said area in a forward direction, timing means for periodically blocking the flow of water from said source of said tubing and for restoring the flow of water from said source to said tubing according to a predetermined time pattern, power means associated with at least some of said supporting means and operatively connected with the flow in said tubing for causing said supporting means to elongate in a direction transverse to said tubing to lift and push said tubing in the forward direction only during those alternate time intervals when flow is restored to said tubing whereby the tubing is caused to be intermittently moved in short increments, said power means comprising a single-acting hydraulic cylinder assembly, including a cylinder member and a piston member, one of such members being arranged to engage the ground surface and the other of such members having a pivotal connection said support means rearwardly of to said tubing to permit swinging movement of said cylinder assembly in a plane generally transverse to said tubing, and stop means carried by said support means and disposed between said tubing and said pnotal connection to preclude swinging movement of said cylinder assembly below said tubing and forwardly past said stop means, said cylinder assembly thereby constrained to pivot to the rear of the length of tubing only so that said length must be driven in the said forward direction.

2. In a self-propelled irrigation system as set forth in claim 1 wherein said source of water at one end of said tubing is at the center of the area to be irrigated, and a traction device is connected to the opposite end of said tubing to control movement of said tubing in a generally circular path around said source.

3. A self-propelled rotary irrigation system as set forth in claim 2 including a hydraulic cylinder on said traction device, a piston within said cylinder, means connecting said cylinder to said tubing to cause said piston to move through a power stroke to propel said traction device when water under pressure is present in said tubing, and means for returning said piston in the reverse direction of the power stroke when the flow is blocked to said tubing.

4. In a self-propelled irrigation system as set forth in claim 1 or 2 including a support foot connected to the lower end of the one of said cylinder and piston members which engages the ground surface, said foot being elongated in the direction of movement thereof.

5. In a self-propelled irrigation system as set forth in claim 1 or 2 including spring means connected between said cylinder member and said piston member for telescoping said cylinder and piston members when flow is blocked to said tubing to reduce the pressure therein.

6. In a self-propelled irrigation system as set forth in claim 5 wherein said cylinder member is in engagement with the ground surface and the piston member is connected to said tubing.

7. In a self-propelled irrigation system as set forth in claim 6 wherein said piston member is provided with an axially extending passageway therethrough, and conduit means connected between said tubing and the upper end of said piston member to conduct flow from said tubing through said piston member and into said cylinder member.

8. In a self-propelled irrigation system as set forth in claim 5, including a plurality of rigid struts secured to said tubing at spaced positions therealong, said struts having a length longer than that of said supporting means measured between said tubing and the ground surface when said hydraulic cylinder and piston members are telescoped whereby said struts are adapted to support the tubing while said supporting means pivots to a position beneath said tubing when flow is blocked to said tubing.

* * * * *